FACSIMILE SYSTEM WHEREIN THE RECORDING IS A MODIFICATION OF THE COPY

Filed Jan. 18, 1951

2 Sheets-Sheet 1

INVENTOR.
FRANK A. HESTER
BY Carl V. Olson
ATTORNEY

Oct. 27, 1953 F. A. HESTER 2,657,258

FACSIMILE SYSTEM WHEREIN THE RECORDING IS A MODIFICATION OF THE COPY

Filed Jan. 18, 1951 2 Sheets-Sheet 2

INVENTOR.
FRANK A. HESTER
BY Carl V. Olson
ATTORNEY

Patented Oct. 27, 1953

2,657,258

UNITED STATES PATENT OFFICE 2,657,258

FACSIMILE SYSTEM WHEREIN THE RECORDING IS A MODIFICATION OF THE COPY

Frank A. Hester, New York, N. Y., assignor to Faximile, Inc., New York, N. Y., a corporation of Delaware Application January 18, 1951, Serial No. 206,689

5 Claims. (Cl. 178—6.6)

The present invention concerns facsimile systems and, in particular, facsimile systems and devices for producing a type of facsimile copy suitable for tactual reading by the blind.

As used herein, facsimile is the art of reproducing printed matter, pictures, or the like electrically at a local or a distant point. The subject matter to be reproduced is usually scanned point by point by means of a photoelectric cell system, and density variations in the subject copy are transformed into electrical signals representing these variations. These electrical signals may be transmitted to the reproducing point by means of wire lines or over a radio channel or by any other means and can be utilized to reproduce, in the recorded copy, density variations in accordance with those of the original copy. The scanning reproducing, and any necessary synchronizing devices can be of a type well known in the art, and any of the various types may be used. While the recorded copy at the receiving end is usually made in the same size as the subject copy, it is sometimes desirable to change the size of the record with respect to the subject copy. In systems and devices according to the present invention, the reproductions at the receiving end will generally be larger than the subject copy to permit easy tactile reading.

Facsimile reproductions at the receiving end are generally in graphic form. However, three dimensional or relief reproductions may be utilized in place of graphic reproductions. In order to make facsimile reproductions readable by the blind, it is necessary to record the facsimile signals in the form of relief copy upon suitable materials, instead of making the usual graphic type of recordings. These reliefs or three dimensional recordings then become intelligible to the blind through their tactual sense. Therefore, in order to make the facsimile records suitable for tactual reading, it is desirable to increase their size with relation to the subject copy and to use relief type recording instead of graphic recording.

Though the changes in size and method of recording, as described above do produce a much more readable recording for the tactual sense of the blind, it has been found that the lines that form the characters of standard type faces are usually too broad or thick to be easily discernible to the tactile sense. This broadening of the lines becomes much more disadvantageous as the size of the recording is enlarged. Characters should consist of sharp, well defined lines in order that they be readily recognizable to the blind person through his tactile sense. Therefore, according to the present invention, a still further improvement is made in such relief copy in that all vertical and diagonal lines are made narrow and sharply defined regardless of the relative width in the subject copy. In the process of varying the thickness of the lines, the width of all vertical lines is made substantially constant regardless of the relative dimensions of the width of the line in the subject copy. As a result, the reproductions so made are much more easily read and understood by the blind. Through experiment, it has been found most convenient to accomplish these results by means of electrical circuits to be more particularly described below.

According to the present invention, the subject copy is scanned by any suitable means, such as a photoelectric cell system, to produce substantially rectangular electrical pulses of current representing the black lines or areas of the subject copy. After being formed in a normal manner, these rectangular pulses of current are fed through a differentiating circuit which produces sharp positive and negative going pulses corresponding to the leading and trailing edges of the initial pulses. Pulses of one polarity are then suppressed in a limiting circuit and the remaining pulses are passed on to a transmitting or marking circuit where they define the width of the vertical lines in the original copy. In this way all vertical lines in the subject or original copy are reduced to a constant, narrow width. In order to reproduce horizontal portions of characters, an additional circuit is provided. If such a circuit were not provided, horizontal lines would appear as very narrow, sharp pulses. Since it is primarily the object of the present invention to narrow the vertical and diagonal lines, and permit the horizontal lines to retain as much of their original characteristics as possible, a circuit has to be included to pass the long pulses representative of horizontal lines. In this additional circuit any rectangular pulse of current, representing a feature of the subject copy, is differentiated in circuits having predetermined, variable time constants. By varying the time constants, the width of the resulting differentiated pulses may be controlled so that all pulses indicative of vertical lines are eliminated. The differentiated impulses that are formed are subtracted from the original rectangular pulses and pulses are formed which are decreased in width by any desired predetermined amount or completely eliminated. In this way narrow vertical lines are entirely eliminated and long horizontal lines are decreased by a small predetermined amount. To complete the process of this additional circuit, pulses of one polarity are eliminated in a limiting circuit and the remaining pulses, being of decreased widths, are passed on and combined with the differentiated impulses passed through the first circuit to form the complete group of pulses indicative of the original copy. In this way, the composite final signal is composed of very narrow constant width pulses for all narrow, vertical lines and impulses decreased in width by a small, predetermined amount for all horizontal lines greater in width than the widest vertical line. In operation, the signals thus provided for transmission and reproduction will produce greatly sharpened relief copy without loss of continuity of horizontal components such as letter crossbars and the like.

It is to be understood that, though the embodiment described herein is concerned with narrowing the vertical and diagonal lines of the reproduction being made, similar circuits could be used also to narrow the width of all of the horizontal lines, if such were found to be desirable. Having described the circuits of the present embodiment, anyone skilled in the art could arrange similar circuits to perform this auxiliary function.

One object of the present invention is to provide a method of, and means for generating facsimile signals suitable for relief reproduction for improved tactual reading.

Another object of the present invention is to provide circuits for reducing the width of all facsimile signals of less than a predetermined amount to a predetermined narrow width and to reduce all other signals by a second predetermined amount.

These and other objects of the present invention will be apparent to those skilled in the art from the detailed description of the invention given in connection with the various figures of the drawing.

Figures 1, 2:
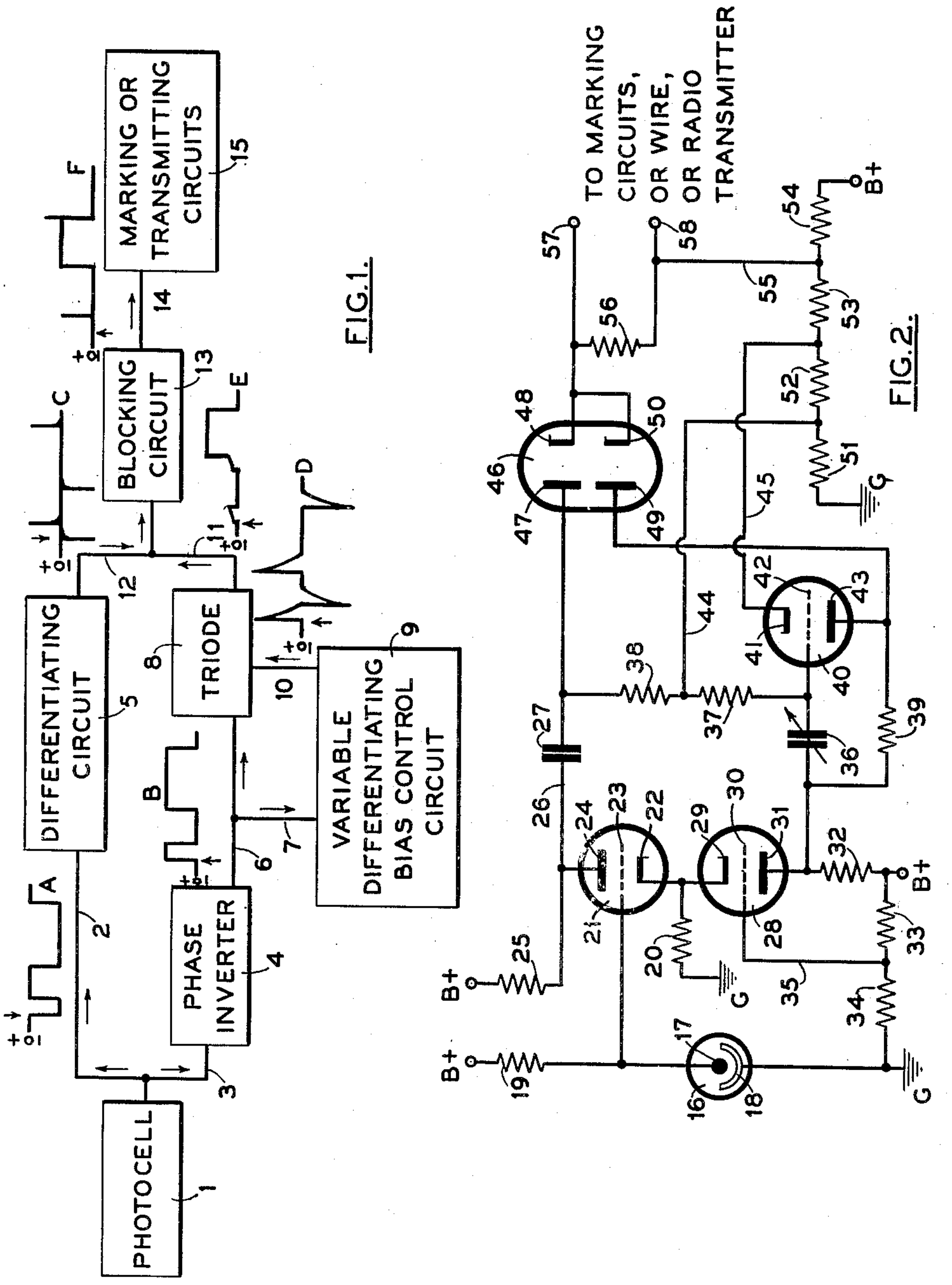
Fig. 1 shows a block diagram of the present invention.
Fig. 2 shows circuit details of the preferred form of the present invention.

In Fig. 1, a photoelectric cell 1 receives the light from the subject copy to be scanned. The current or voltage variations resulting from the scanning process are passed over lead 2 to differentiating circuit 5. For purposes of illustration, these current or voltage variations may be of the form shown at A. The current or voltage curve A may be seen to consist of a narrow, negative rectangular, pulse followed by a space and then a long, negative pulse. If differentiating circuit 5 has a very short time constant, the output conducted over lead 12 will have the form shown in C in which the leading and trailing edges of the first narrow pulse of curve A result in a sharp negative and positive pulse, respectively, and the longer rectangular pulse of A may result in negative and positive pulses separated by a relatively greater distance. At the same time that the above is taking place, the photoelectric cell current or voltage is also passed over leads 3 to phase inverter 4, resulting in pulses of the form shown at B in lead 6. The inverted wave from B is passed through two circuits, one is a triode 8 and the other, over lead 7, is the variable differentiating bias control circuit 9. In the variable differentiating bias control circuit 9, pulses are generated at the leading and trailing edges of the wave shown at B, having durations determined by the time constants of the differentiating circuit 9. These differentiated pulses are illustrated at D and are conducted over lead 10 to triode 8. Triode 8 is connected in such a manner that positive pulses from the variable differentiating bias control circuit 9, as shown at D, short-out corresponding portions of positive pulses received directly as shown in wave form B. This action will result in substantial cancellation of the first initial narrow pulse in wave form B, representative of a vertical graphic line, and the decrease in width of the wider pulse, representative of a horizontal line. This decrease in width of the second pulse will be constant, dependent on the width of the pulses generated in the variable differentiating bias control circuit 9.

The output of the differentiating circuit 5 is fed, by means of lead 12, to blocking circuit 13; and the output of triode 8 is fed through lead 11 to blocking circuit 13. Here, the negative pulses from both sources are suppressed and the resulting wave is fed over lead 14 to the marking or transmitting circuit 15. Therefore, marking or transmitting circuit 15 receives a narrow pulse, from the circuit including differentiating circuit 5, and a wider pulse, from the differentiating circuit 9, making a composite wave as shown at F. The resultant wave form shown at F illustrates how the initial wave form shown at A has been changed so that the initial narrow pulse representing a vertical line is transformed into a very narrow pulse, and the following wide pulse representing a horizontal line is decreased in width by an amount corresponding with the initial narrow pulse. The utilization of the signals represented by the wave form F, in the reproduction process, provides the improved relief copy set forth in the above description of the present invetnion.

Fig. 2 shows the particular circuit which may be used to accomplish the results that were described in connection with Fig. 1. A beam of light, used for scanning the subject copy, is reflected from the copy into photoelectric cell 16 which includes cathode 18 and anode 17. Cathode 18 is connected to ground G, while anode 17 is connected to a source of bias voltage B+ through load resistor 19. Anode 17 is also connected to grid 23 of the direct current amplifier tube 21. Cathode 22 of direct current amplifier 21 and cathode 29 of direct current amplifier 28 are connected together and to cathode resistor 20, which is in turn connected to ground G. Plate 24 of tube 21 is connected to B+ through load resistor 25 and plate 31 of tube 28 is connected to B+ through load resistor 32. When white subject matter is being scanned, photoelectric cell 16 is rendered conductive and current flowing through load resistor 19 causes anode 17 to assume a voltage substantially below the voltage of B+. The circuit arrangement described is so chosen that, when the voltage of anode 17 is at a minimum, grid 23 assumes a low enough voltage to cut off tube 21. Grid 30, being connected to the junction between resistors 33 and 34, connected between B+ and ground, has a bias which permits tube 28 to be conductive while tube 21 is cut off. When black subject copy is being scanned, photoelectric cell 16 is essentially non-conducting and little or no current flows through resistor 19. Grid 23 thus assumes a more positive potential allowing current to flow through resistor 20, cathode 22 and plate 24. This cathode current develops a positive bias across resistor 20 which is applied to cathode 29 making it more positive than grid 30, thereby causing tube 28 to cut off and plate 31 to assume the same potential as B+. In view of the functioning described above it is apparent that a signal will be developed across resistor 25 which varies inversely with the optical density of the subject copy and comprises a series of negative rectangular pulses of varying widths. The voltage that is developed across plate load resistor 32 will comprise a signal varying directly with the optical density and consisting of a series of positive rectangular pulses of varying widths. These negative and positive pulses of varying widths which appear at tubes 21 and 28 may be as illustrated at A and B, respectively, in Fig. 1.

The differentiating circuit, consisting of capacitor 27 connected in series with resistor 38, is connected over lead 26 to plate 24. Differentiated pulses are applied to plate 47 of one-half of the double diode 46 by connecting plate 47 to the junction between capacitor 27 and resistor 38. Cathode 48 of diode 47–48 is returned to a point on the voltage divider, consisting of resistors 51, 52, 53 and 54 connected between B+ and ground. This connection is made through resistor 56 and over lead 55 and is at a point of such potential that only positive pulses appearing at plate 47 are passed on to terminal 57, all negative pulses being substantially suppressed. The differentiated pulses appearing at plate 47, resulting from the application of a signal such as shown at A in Fig. 1, are illustrated at C in Fig. 1, and only the positive pulses appear at 57.

The circuit thus far described operates upon a pulse of less than the predetermined width, as illustrated by the lefthand pulse of A in Fig. 1, and provides a pulse of constant narrow width as shown by lefthand pulse at F in Fig. 1. Therefore, all marks or vertical lines in the subject copy which will produce a pulse having a width of less than a predetermined amount will be converted to and transmitted in the form of pulses of a constant, very narrow width. In this manner, signals suitable for sharpened relief reproduction are provided whereby tactual reading is greatly facilitated.

In order that the narrowing or sharpening of the reproduced letters will not eliminate all horizontal lines, it is necessary that lines resulting in pulses greater than a certain predetermined pulse width be passed on through the circuit with as little distortion as possible. This is accomplished, as indicated in Fig. 2, by applying the inverted signal appearing at plate 31 to a variable time constant differentiating circuit consisting of variable capacitor 36 connected in series with resistor 37. Capacitor 36 may be adjusted to provide differentiation pulses having widths as illustrated at D of Fig. 1. The width of these differentiation pulses represents the width needed to eliminate all vertical signals. These differentiation pulses are applied to grid 42 of limiter tube 40. Cathode 41 of tube 40 is connected to such a point on voltage divider 51, 52, 53, 54, that tube 40 is normally cut off and negative pulses applied to the grid have no effect. The signals appearing at plate 31 of tube 28, indicated by B in Fig. 1, are also applied to plate 43 of tube 40 through resistor 39. When tube 40 is conducting, due to the positive differentiation pulses appearing at grid 42, the plate resistance of the tube is very low, thereby effectively shorting out any signal applied to plate 43 through resistor 39. Since one of these shorting differentiation pulses occurs at the leading portion of the wide righthand pulse shown at B in Fig. 1, a small, predetermined portion of this pulse will be blocked out, leaving a slightly narrowed pulse as shown at E in Fig. 1, but the pulse will be otherwise unaffected. The resulting signal at plate 43 is applied to plate 49 of diode 49—50, which passes threshold-limited positive pulses to output terminal 57; thus, a narrowed pulse, as shown at E in Fig. 1, is passed on to terminal 57.

The combination of the sharp pulse, generated by the first-described portion of the circuit, representing vertical lines, and the narrowed longer pulse generated by the last-described portion of the circuit, representing horizontal lines, forms the composite wave shown at F in Fig. 1. Vertical lines in the subject copy are reduced to pulses of predetermined width and longer horizontal lines scanned in the subject copy are reduced by small predetermined amount.

Figure 3:
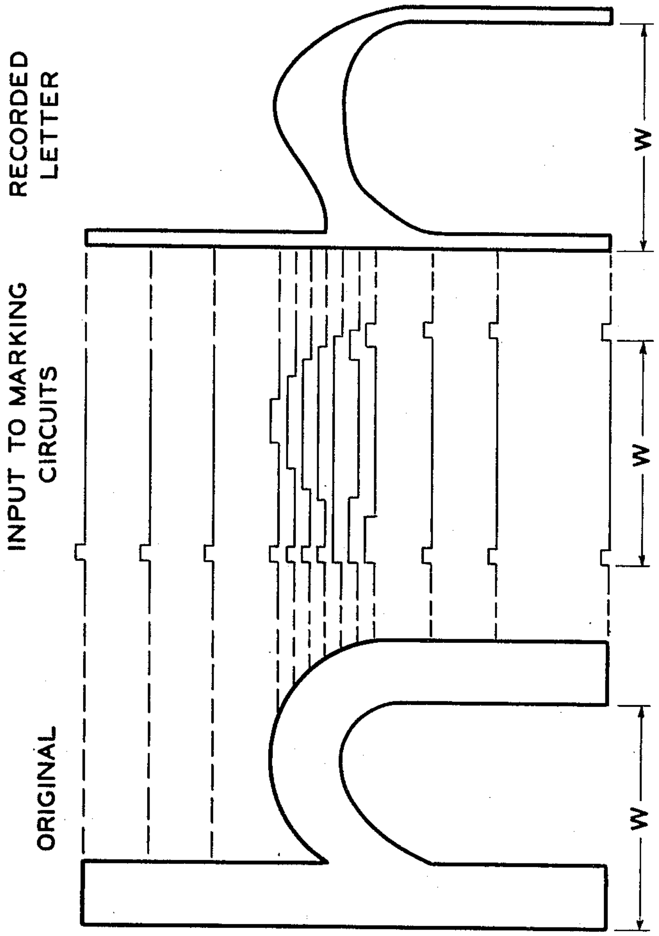
Fig. 3 illustrates how a letter is reproduced according to the present invention.

Fig. 3 illustrates how the above described circuit operates upon a typical printed character. The original character is shown having relatively wide vertical lines. The reproduced letter to the right of the drawing has very narrow vertical lines and, if of an embossed or relief character, is much more readable to the finger of a blind person than the original letter. The change in shape of the letter is brought about by means of the circuits described above. The scanning device views the original character point by point and line by line; e. g., a point moves from left to right over the character on paths that are progressively displaced from the top to the bottom of the character. Electrical marking signals are generated, as described above, the signals corresponding to a few of the scan lines being illustrated in the central portion of Fig. 3. The resulting recorded character of Fig. 3 is seen to differ from the scanned character in the desired respects.

Though only one embodiment of the present invention has been presented and described, it is to be understood that the general circuit design may be varied in any of a great number of ways without changing the functioning of the circuit. Therefore, it is to be understood that the inventor does not intend to be limited to the specific embodiment shown and described since many embodiments will be apparent to those skilled in the art within the scope of the invention as set forth in the appended claims.

What is claimed is:

1. In a facsimile system; a source of substantially rectangular electrical signal pulses derived from the point by point and line by line scanning of graphic copy; differentiator circuit means receptive to pulses from said source and operative to convert said pulses to narrow pulses at the leading and trailing edges thereof; circuit means, also receptive to pulses from said source, selectively responsive to pulses of greater than a predetermined width and operative to cancel a leading portion of all pulses; and means for combining the outputs of said two circuit means; whereby said signal pulses of less than a predetermined width are translated to narrow pulses and signal pulses of more than the predetermined width are translated to pulses narrowed by a uniform small amount.

2. In a facsimile system; a source of substantially rectangular electrical signal pulses derived from the point by point and line by line scanning of graphic copy; differentiator circuit means receptive to pulses from said source and operative to convert said pulses to narrow pulses at the leading and trailing edges thereof; circuit means, also receptive to pulses from said source, selectively responsive to pulses of greater than a predetermined width and operative to cancel a leading portion of all pulses; and means for selecting and combining the outputs of said two circuit means.

3. In a facsimile system; a source of substantially rectangular electrical signal pulses derived from the point by point and line by line scanning of "black and white" graphic copy; differentiator circuit means receptive to pulses from said source and operative to convert said pulses to narrow pulses at the leading and trailing edges thereof; circuit means including a variable differentiating bias control circuit, also receptive to pulses from said source, selectively responsive to pulses of greater than a predetermined width and operative to cancel a leading portion of all pulses; and means for combining the outputs of said two circuit means.

4. In a facsimile system; a source of substantially rectangular electrical signal pulses derived from the point by point and line by line scanning of "black and white" graphic copy; differentiator circuit means receptive to pulses from said source and operative to convert said pulses to narrow pulses at the leading and trailing edges thereof; circuit means, also receptive to pulses from said source, including a variable differentiating bias control selectively responsive to pulses of greater than predetermined width, and a combining circuit operative to cancel a leading portion of all pulses, whereby pulses of less than a certain width are cancelled and pulses of greater than the certain width are norrowed, and means for combining the outputs of said two circuit means.

5. In a system for recording graphic copy comprising a source of substantially rectangular signals derived from scanning "black and white" characters, a differentiating circuit receptive to said pulses and operative to convert said pulses to narrow pulses at the leading and trailing edges thereof; circuit means also receptive to pulses from said source comprising a phase inverter for said rectangular pulses, a differentiating bias control circuit selectively responsive to pulses of greater than predetermined width, and a circuit connected to said inverter and bias control circuit operative to cancel pulses of less than a certain width and to narrow pulses greater than a certain width by a uniform amount; and a circuit for combining the outputs of the two circuit means to produce pulses wherein vertical lines of said characters are reduced to pulses of predetermined width and horizontal lines are reduced by a predetermined amount.

FRANK A. HESTER.

References Cited in the file of this patent

UNITED STATES PATENTS

| Number | Name | Date |
|---|---|---|
| 2,240,420 | Schnitzer | Apr. 29, 1941 |
| 2,278,692 | Eller | Apr. 7, 1942 |
| 2,376,034 | Collings | May 15, 1945 |